(12) United States Patent
Magnusson et al.

(10) Patent No.: US 11,452,354 B1
(45) Date of Patent: Sep. 27, 2022

(54) ELECTRONIC FINGERNAIL DISPLAY

(71) Applicants: Marta Magnusson, Grimsby (CA); Stefan Magnusson, Grimsby (CA)

(72) Inventors: Marta Magnusson, Grimsby (CA); Stefan Magnusson, Grimsby (CA)

(*) Notice: Subject to any disclaimer, the term of this patent is extended or adjusted under 35 U.S.C. 154(b) by 0 days.

(21) Appl. No.: 17/460,218

(22) Filed: Aug. 28, 2021

(51) Int. Cl.
| | |
|---|---|
| *A45D 31/00* | (2006.01) |
| *H04W 4/80* | (2018.01) |
| *G06F 3/147* | (2006.01) |
| *G06F 1/16* | (2006.01) |
| *G06F 3/01* | (2006.01) |

(52) U.S. Cl.
CPC ........... *A45D 31/00* (2013.01); *G06F 1/1601* (2013.01); *G06F 3/014* (2013.01); *G06F 3/147* (2013.01); *H04W 4/80* (2018.02)

(58) Field of Classification Search
CPC ........ A45D 44/005; A45D 31/00; G09G 5/02; G09G 5/003; G09G 5/12; G02F 1/167
See application file for complete search history.

(56) References Cited

U.S. PATENT DOCUMENTS

| | | | |
|---|---|---|---|
| 7,547,286 B2 * | 6/2009 | Choate | G06F 3/0219 600/595 |
| 7,832,405 B1 * | 11/2010 | Schlueter | A61F 2/389 128/898 |
| 2009/0278798 A1 * | 11/2009 | Kim | G06F 3/017 345/158 |
| 2011/0061670 A1 * | 3/2011 | Schneider | C09K 19/586 132/200 |
| 2011/0283754 A1 * | 11/2011 | Ezzo | E05B 73/0017 70/57.1 |
| 2015/0189971 A1 * | 7/2015 | Hakeem | A45D 31/00 132/200 |
| 2016/0295989 A1 * | 10/2016 | Hakeem | G09G 5/02 |
| 2017/0079393 A1 * | 3/2017 | Lin | A45C 11/00 |
| 2019/0004604 A1 * | 1/2019 | Wang | G02B 27/017 |

FOREIGN PATENT DOCUMENTS

| | | | | |
|---|---|---|---|---|
| WO | WO-2013180391 A1 * | 12/2013 | | A45D 29/00 |
| WO | WO-2018228609 A1 * | 12/2018 | | A45D 31/00 |

* cited by examiner

*Primary Examiner* — William Lu
(74) *Attorney, Agent, or Firm* — Marc J. Whipple

(57) ABSTRACT

An electronic fingernail display is disclosed. An LCD or LED display is mounted on a human finger, covering part or all of the nail with a display that can show patterns, images, or other ornamental display items. Electronic controller elements are integrated into the display or a mounting element which provide power, control, and communications capability allowing the display item to be changed without physical removal or modification of the electronic fingernail display.

2 Claims, 1 Drawing Sheet

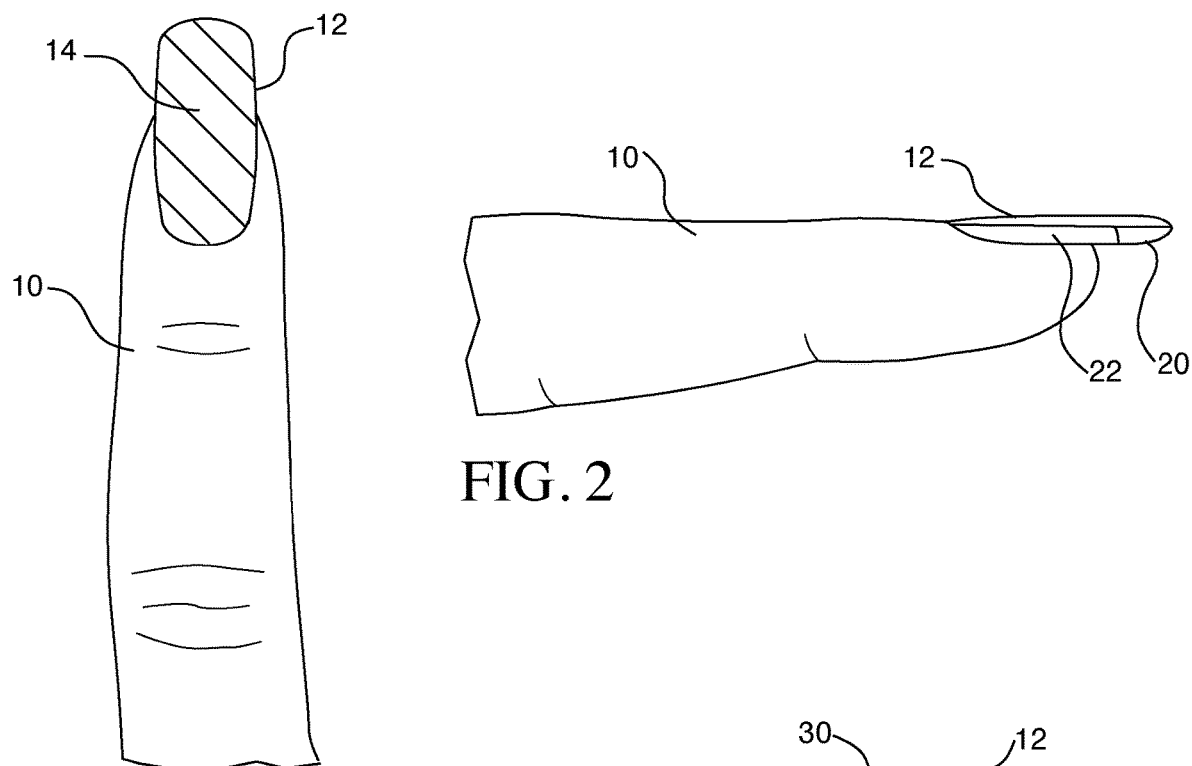
FIG. 1
FIG. 2
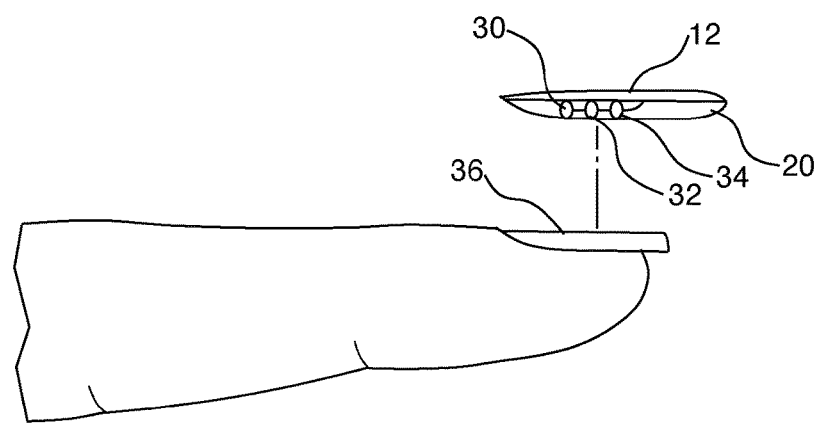
FIG. 3
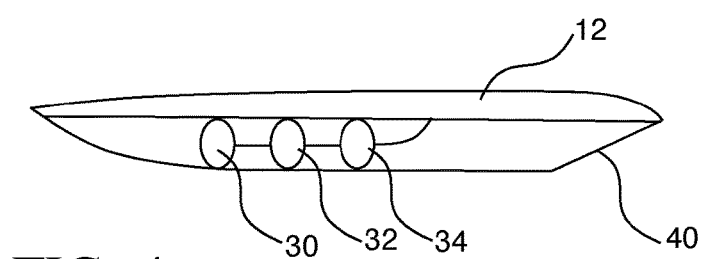
FIG. 4

ELECTRONIC FINGERNAIL DISPLAY

This invention relates to a display system which can be mounted onto human fingernails. An underlayment allows the attachment of an LCD or LED screen to a fingernail, with a microcontroller, power source, and communications device which allow the display of multiple patterns or images on the screen.

BACKGROUND OF THE INVENTION

The present invention relates to a system which allows displays to be mounted on human fingernails. Ornamentation of fingernails is old in the art and in human history: nail polish, paint, and physical ornamentations are commonly used to decorate or enhance fingernails for esthetic reasons. For purposes of this application, nail polish, paint, varnish, glitter, physical ornamentation such as plastic or metal objects, will be collectively referred to as "ornamentation." Although ornamentation can be removed and changed, once applied such ornamentation is static and must either be removed or covered to change the ornamentation.

Ornamentation of nails is very common in multiple cultures and the expense and physical stress (damage to nails, exposure to solvents, et cetera) are issues which affect the use and enjoyment of such ornamentation. A device which allowed dynamic change without damage, use of solvents, etc, would be an improvement on the present state of the art.

Furthermore, many forms of modern ornamentation require the attention of a professional nail technician or cosmetologist, both because the ornamental techniques are highly technical and because the artistic ornamentation (patterns, pictures, lettering, et cetera) requires an experienced artist to apply successfully and in an esthetically pleasing way. A device which allowed people to change the ornamentation of their nails without the services of a professional would be an improvement on the present state of the art.

An electronic fingernail display allowing dynamic change of nail ornamentation would be a useful invention.

An electronic fingernail display which allowed the display of multiple images or patterns would be a useful invention.

An electronic fingernail display which was self-contained and easily upgradable or changeable would be a useful invention.

The present invention addresses these concerns.

SUMMARY OF THE INVENTION

Among the many objectives of the present invention is the provision of an electronic fingernail display which allows dynamic ornamentation of fingernails.

Another objective of the present invention is the provision of an electronic fingernail display which allows the display of multiple ornamentation on fingernails without additional expense or damage to the fingernails.

Yet another objective of the present invention is the provision of an electronic fingernail display which allows nail ornamentation to be changed without the services of a professional nail technician or cosmetologist.

Other advantages and objectives of the present invention will become clear by reading the application and the disclosures herein.

BRIEF DESCRIPTION OF THE DRAWINGS

FIG. 1 depicts an overhead view of the electronic fingernail display mounted on a human finger.

FIG. 2 depicts a side view of the electronic fingernail display mounted on a human finger.

FIG. 3 depicts a cutaway side view of the electronic fingernail display including abstracted electronic elements in proximity to a human finger with a mounting receiver attached to the nail of the human finger.

FIG. 4 depicts a cutaway side view of the electronic fingernail display including abstracted electronic elements

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

It should be noted that the sizes and configurations of the preferred embodiment(s) described in the drawings are exaggerated for clarity of disclosure: in actual practice, the tolerances between the elements of embodiments of the invention would be much more precise. It is a feature of the invention that it allows such very precise tolerances.

For purposes of this invention, the electronic elements of the fingernail display are described as being "electrically connected." Such a connection can be made via physical conductors (wires, PCB conductive paths, conductive inks, et cetera) or by any other reasonable means. Two or more separately described electronic elements may also be integrated into a single electronic chip or component.

By referring to FIG. 1, the basic nature of the invention can be easily understood. FIG. 1 depicts a human finger 10, belonging to a human being (otherwise not shown) who will be referred to as the "user." Although the electronic fingernail display can only be used by one user at a time, it may be swapped between wearers, and the person or persons who input display information or other commands to the electronic fingernail display may not be the person who is wearing the electronic fingernail display at any given time. "User" includes both the wearer of the electronic fingernail display at a particular time and the person or persons who have input display information into the electronic fingernail display. Covering the fingernail (not shown, see FIG. 2) of the user is display 12, which is currently displaying a display pattern 14, comprising diagonal stripes. The display pattern may be any display pattern, image, text, or even moving images or sequential or scrolling elements which the display is capable of displaying and the electronic fingernail display is capable of communicating to the display. The display can, with appropriate electronic support (NOT SHOWN) even show live video streamed through an appropriate wireless interface. All such information shall be referred to as "display input" for purposes of this application.

FIG. 2 shows an abstracted view of the electronic fingernail display. Base 20 is attached to fingernail 22, via any reasonable adhesive means such as double-sided tape adhesive, nail epoxy, et cetera or via a mounting receiver (see FIG. 3.) Base 20 allows for the removable mounting of display 12. Display 12 can be snap-fitted, friction-fitted, magnetically attached, or attached to fingernail 22 in any other reasonable way.

FIG. 3 shows the preferred embodiment with the necessary elements and a mounting receiver. Base 20 contains battery 30, wireless controller 32, and display controller 34. Battery 30 can be a chemical battery, a capacitor or a super-capacitor, or any other reasonable means of storing adequate power to power the electronic fingernail display. Battery 30 provides power to wireless controller 32, which can communicate via Bluetooth, Wi-Fi, Near Field Communication (NFC,) or any other reasonable wireless communications method with a separate computer, phone, or other device (NOT SHOWN) which allows the user to send commands to the electronic fingernail display, such as graphic patterns, timing control commands, et cetera. Wireless controller 32 sends the commands to display controller 34, which is likewise powered (either in-line or separately) by battery 30, which sends display information to display 12, which then displays the image, pattern, et cetera provided by the user through wireless controller 32. Display 12 can be an LED display, an LCD display, an electrophoretic (also known as "e-paper" or "e-ink") display, or any other reasonable type of display unit. Display 12 may be a passive display system or incorporate an input means such as a capacitive or resistive touch-screen functionality. Mounting receiver 36 is attached to the fingernail by adhesive, magnetic attraction, or any other desired means. It is preferred, but not required, that mounting receiver 36 be attached via a strong but removable adhesive so that it is stable and remains in place during ordinary daily activity. Base 20 is snap-fitted, friction-fitted, or magnetically affixed to mounting receiver 36, allowing use of the electronic fingernail display. When it is desired to charge the battery, Base 20 is removed from the mounting receiver 36 and placed in proximity to a wireless charging system. (It is strongly preferred that wireless charging be used and the base removed for charging, but it is not required.) Although most wireless communications means will work while the base is in place, it may also be convenient to remove base 20 and place it in proximity of a wireless communications device (e.g. "smart" wireless charging systems which can not only charge by induction but directly communicate with the item being charged during the charging process.)

FIG. 4 shows an alternate embodiment of the electronic fingernail display comprising a single physical element comprising the display 12, display body 40, battery 30, wireless controller 32, and display controller 34. This embodiment of the electronic fingernail display can be attached directly to the fingernail either by adhesive or by magnetic means if the fingernail is first painted with magnetic polish and a magnetic element (NOT SHOWN) is included in the electronic fingernail display.

In an alternate embodiment of the invention (NOT SHOWN) a combination magnetic and physical interlocking means is used wherein the base as shown in FIG. 3 has a magnetic locking tab which interconnects with a locking tab receiver element on the mounting receiver. Once engaged, the magnetic locking tab must be lifted, pulled or pushed clear of the locking tab receiver element, which is done by bringing a magnet (NOT SHOWN) into proximity with the magnetic locking tab. The magnetic attraction or repulsion between the magnet and the magnetic locking tab lifts, pulls, or pushes the magnetic locking tab clear of the locking tab receiver element, allowing the base to be removed from the mounting receiver. The magnetic locking tab may or may not itself be actively magnetic, but it is required that it be able to be moved by magnetic attraction. The magnet may be an electromagnet, a ferromagnet, a rare-earth magnet, or any other desired source of magnetic attraction. In an alternate configuration, instead of the magnetic locking tab being moved by the magnet, a magnetic locking tab receiver element is able to be moved by magnetic attraction, causing it to disengage with a non-magnetic locking tab when the magnet is brought into proximity with the magnetic locking tab receiver element.

In a second alternate embodiment of the invention (NOT SHOWN) the base as depicted in FIG. 3 comes pre-attached to a mounting receiver as shown in FIG. 3, or configured such that the base and the mounting receiver can be pre-attached by a user or other person prior to mounting the mounting receiver on the user's fingernail, and an adhesive such as epoxy is used to mount the receiver on the user's fingernail with the base pre-attached to the mounting receiver, allowing for easier and more precise alignment of the mounting receiver and base with the user's fingernail.

In a third alternate embodiment of the invention (NOT SHOWN) a liquid which rapidly solidifies or a highly malleable solid material as is used to make a mold of the user's fingernail, and the mold is then used to create a mounting receiver, which can then in turn be mounted on the user's fingernail with adhesive, magnetic polish, et cetera.

While various embodiments and configurations of the present invention have been described above, it should be understood that they have been presented by way of example only, and not limitation. Thus, the breadth and scope of the present invention should not be limited by any of the above exemplary embodiments.

This application—taken as a whole with the abstract, specification, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

What is claimed and sought to be protected by Letters Patent is:

1. An electronic fingernail display comprising:
   a) a display mounted on a fingernail, the display having a magnetic locking tab;
   b) a display controller electronically connected to the display;
   c) a wireless controller which can communicate a display input to the display controller;
   d) a power source which can power the wireless controller, the display controller, and the display; and,
   e) a mounting receiver having a magnetic locking tab receiver element, the mounting receiver being removably affixable to the fingernail, such that the display is mounted to the fingernail by being engaged with the mounting receiver and the magnetic locking tab thus being engaged with the magnetic locking tab receiver element, the magnetic locking tab disengaging from the magnetic locking tab receiver, and the display thus disengaging from the mounting receiver, when a magnet is brought into proximity with the magnetic locking tab.

2. An electronic fingernail display as in claim 1, wherein the display, the display controller, the wireless controller, and the power source comprise a single physical display unit.

* * * * *